United States Patent
Meriac et al.

(10) Patent No.: US 10,810,098 B2
(45) Date of Patent: Oct. 20, 2020

(54) PROBABILISTIC PROCESSOR MONITORING

(71) Applicant: ARM IP Limited, Cambridge (GB)

(72) Inventors: Milosch Meriac, Cambridge (GB); Thomas Christopher Grocutt, Cambridge (GB); Jonathan Michael Austin, Oxford (GB); Geraint David Luff, Cambridge (GB)

(73) Assignee: Arm IP Limited, Cambridge (GB)

( * ) Notice: Subject to any disclaimer, the term of this patent is extended or adjusted under 35 U.S.C. 154(b) by 0 days.

(21) Appl. No.: 15/749,108

(22) PCT Filed: Jul. 29, 2016

(86) PCT No.: PCT/GB2016/052337
§ 371 (c)(1),
(2) Date: Jan. 30, 2018

(87) PCT Pub. No.: WO2017/021706
PCT Pub. Date: Feb. 9, 2017

(65) Prior Publication Data
US 2018/0225188 A1  Aug. 9, 2018

(30) Foreign Application Priority Data
Jul. 31, 2015  (GB) .................................. 1513525.4

(51) Int. Cl.
*G06F 11/30* (2006.01)
*G06F 11/34* (2006.01)
(Continued)

(52) U.S. Cl.
CPC ...... *G06F 11/3075* (2013.01); *G06F 11/0751* (2013.01); *G06F 11/3037* (2013.01);
(Continued)

(58) Field of Classification Search
CPC ............. G06F 11/3075; G06F 11/3037; G06F 11/3452; G06F 21/563; G06F 11/3476; G06F 2201/87
See application file for complete search history.

(56) References Cited

U.S. PATENT DOCUMENTS 5,999,503 A * 12/1999 Tateishi .............. G11B 7/08511
369/44.29
6,601,149 B1 * 7/2003 Brock ................... G06F 11/323
711/154

(Continued)

FOREIGN PATENT DOCUMENTS

WO   1998-045778 A2   10/1998
WO   1998-045778 A3   12/1998

OTHER PUBLICATIONS

PCT International Search Report and Written Opinion; PCT/GB2016/052337; dated Nov. 10, 2016.
(Continued)

*Primary Examiner* — Joseph D Torres
(74) *Attorney, Agent, or Firm* — Pramudji Law Group PLLC; Ari Pramudji

(57) ABSTRACT

A first processing component samples and lossily accumulates statistical activity data by generating at least one data bucket by segmenting a memory window in a memory and providing a map of the segmented memory window; sampling to detect activity in the data bucket and surjectively populating the map with statistical activity data; and responsive to a trigger, passing at least part of a population of the map to a second processing component. The second processing component receives and stores the at least part of the population of the surjective map, compares it with at least one previously stored map population; and on detecting anomalous patterning, performs an "anomaly detected" action.

15 Claims, 3 Drawing Sheets

(51) Int. Cl.
*G06F 11/07* (2006.01)
*G06F 21/50* (2013.01)
*G06F 21/56* (2013.01)

(52) U.S. Cl.
CPC ...... *G06F 11/3082* (2013.01); *G06F 11/3452* (2013.01); *G06F 11/3476* (2013.01); *G06F 21/50* (2013.01); *G06F 21/563* (2013.01); *G06F 11/3013* (2013.01); *G06F 2201/87* (2013.01); *G06F 2201/88* (2013.01)

(56) References Cited

U.S. PATENT DOCUMENTS

| | | | |
|---|---|---|---|
| 6,701,412 | B1 | 3/2004 | Mcdougall et al. |
| 2003/0005156 | A1* | 1/2003 | Miryala ............ G06F 15/17375 709/245 |
| 2003/0226032 | A1* | 12/2003 | Robert ................ H04L 63/1408 726/23 |
| 2004/0093516 | A1* | 5/2004 | Hornbeek ............... H04L 63/10 726/7 |
| 2004/0177230 | A1* | 9/2004 | Freiwald ................. G06F 9/342 711/212 |
| 2007/0156973 | A1* | 7/2007 | Fleischer ............... G06F 12/109 711/147 |
| 2010/0064144 | A1* | 3/2010 | Kaabouch ........... G06F 12/1408 713/190 |
| 2011/0167491 | A1 | 7/2011 | Ruggerio |
| 2012/0054374 | A1 | 3/2012 | Carter et al. |
| 2014/0379714 | A1 | 12/2014 | Hankins |
| 2016/0306635 | A1* | 10/2016 | Nakajima ................. G06F 1/06 |
| 2018/0013579 | A1* | 1/2018 | Fairweather ........... H04L 67/125 |
| 2019/0121685 | A1* | 4/2019 | Coutinho ............ G06F 11/3476 |

OTHER PUBLICATIONS

UKIPO Search and Examination Report; GB 1513525.4; dated Feb. 9, 2016.

* cited by examiner

PROBABILISTIC PROCESSOR MONITORING

CROSS-REFERENCE TO RELATED APPLICATIONS

This application is a US national phase of PCT/GB2016/052337 filed 2016 Jul. 29, which claims priority to United Kingdom Patent Application No. 1513525.4 filed 2015 Jul. 31, both of which are titled PROBABILISTIC PROCESSOR MONITORING and the entire disclosures of which are herein incorporated by reference.

The present invention relates to a technology for monitoring processor activity, the technology having wide applicability, for example, in detecting malware and incorrect code or data in one or more of a population of processors.

Since the advent of the Internet, there has been a rapid increase in the interconnectedness of devices capable of storing and processing data. Now, with the development of what is called the Internet of Things (IoT), devices which were not conventionally equipped to store and process data are becoming so equipped. One example is that of a domestic refrigerator that is provided with the capability to recognise encoded data associated with a perishable food item, storing the data in device storage, and subsequently warning a user over a network to a smartphone of an impending "use by" date for the food item.

Such extended capabilities for devices bring advantages, but at the same time the devices may be disadvantageously vulnerable to potentially harmful activity, which may comprise threats to the system or to the wider network, whether caused inadvertently by incorrect programs or, worse, by deliberate insertion of malicious code or of false data that may vitiate the effects of otherwise non-malicious execution code. The interconnectedness of modern devices means that untrustworthy code or data may become widely disseminated over the network, so that it is present in many devices, each of which may in turn act as a new source of onward infection.

Detection of malware or incorrect code and data by conventional means is resource-intensive, and thus, although it is an important activity, it may sometimes be disregarded in favour of the use of system resources for productive application purposes. In conventional systems, permanent or regular monitoring of processor node execution may be so resource intensive as to be prohibitive, as such monitoring may consume many processor cycles and large amounts of storage, both for the monitor code itself and for the accumulated statistical data that is generated.

In the Internet of Things, in particular, there are many very compact processors for use in devices (sometimes portable) that need to use low-footprint non-user service techniques that retain only very little code and data in processor memory or associated storage, so that as much as possible of the available resource can be dedicated to those services that are of direct utility to the user.

In a first aspect of the herein-disclosed technology, there is provided machine-implemented method of operating a first processing component for sampling and lossily accumulating statistical activity data, the method comprising generating at least one data bucket by segmenting a memory window in a memory of said processing component and providing at least one map of the segmented memory window; sampling to detect activity in said at least one data bucket and surjectively populating said at least one map with statistical activity data; and responsive to a trigger, passing at least a part of a population of said at least one map to a second processing component.

In a second aspect, there is provided a machine-implemented method of operating a second processing component in cooperation with a first processing component to analyse lossily accumulated statistical activity data, the method comprising receiving at least a part of a population of at least one surjective map of a segmented memory window of said first processing component; storing said at least a part of said population of said at least one map; comparing said population of said at least one map with at least one previously stored map population; and on detecting anomalous patterning of said at least one map with respect to said at least one previously stored map, performing an "anomaly detected" action by said second processing component to at least said first processing component.

In a third and fourth aspect, there are provided computer program products comprising computer-program code tangibly stored on a computer-readable medium, the computer program code executable by a computer system to perform the steps of the method according to the first or the second aspect.

In a fifth aspect, there is provided a first processing component for sampling and lossily accumulating statistical activity data and adapted to perform the steps of the method of the first or the second aspect.

In a sixth aspect, there is provided a machine-implemented method for detecting symptoms of malware in a processor population of at least a first processing component and a second processing component, the method comprising steps of receiving at said second processing component a surjectively populated map of lossily accumulated statistical activity indicia for at least one memory window at said first processing component; comparing said surjectively populated map with an expected map of lossily accumulated activity indicia for memory windows of said processor population; detecting an anomalous pattern in said surjectively populated map with reference to said expected map; and performing at least one protective action against said malware.

In a seventh aspect, there is provided a machine-implemented method for detecting symptoms of incorrect code functioning in a processor population of at least a first processing component and a second processing component, the method comprising steps of receiving at said second processing component a surjectively populated map of lossily accumulated statistical activity indicia for at least one memory window at said first processing component; comparing said surjectively populated map with an expected map of lossily accumulated activity indicia for memory windows of said processor population; detecting an anomalous pattern in said surjectively populated map with reference to said expected map; and performing at least one protective action against said incorrect code functioning.

The techniques and apparatus herein disclosed will now be described, by way of example only, with reference to the accompanying drawings, in which.

Figure 1:
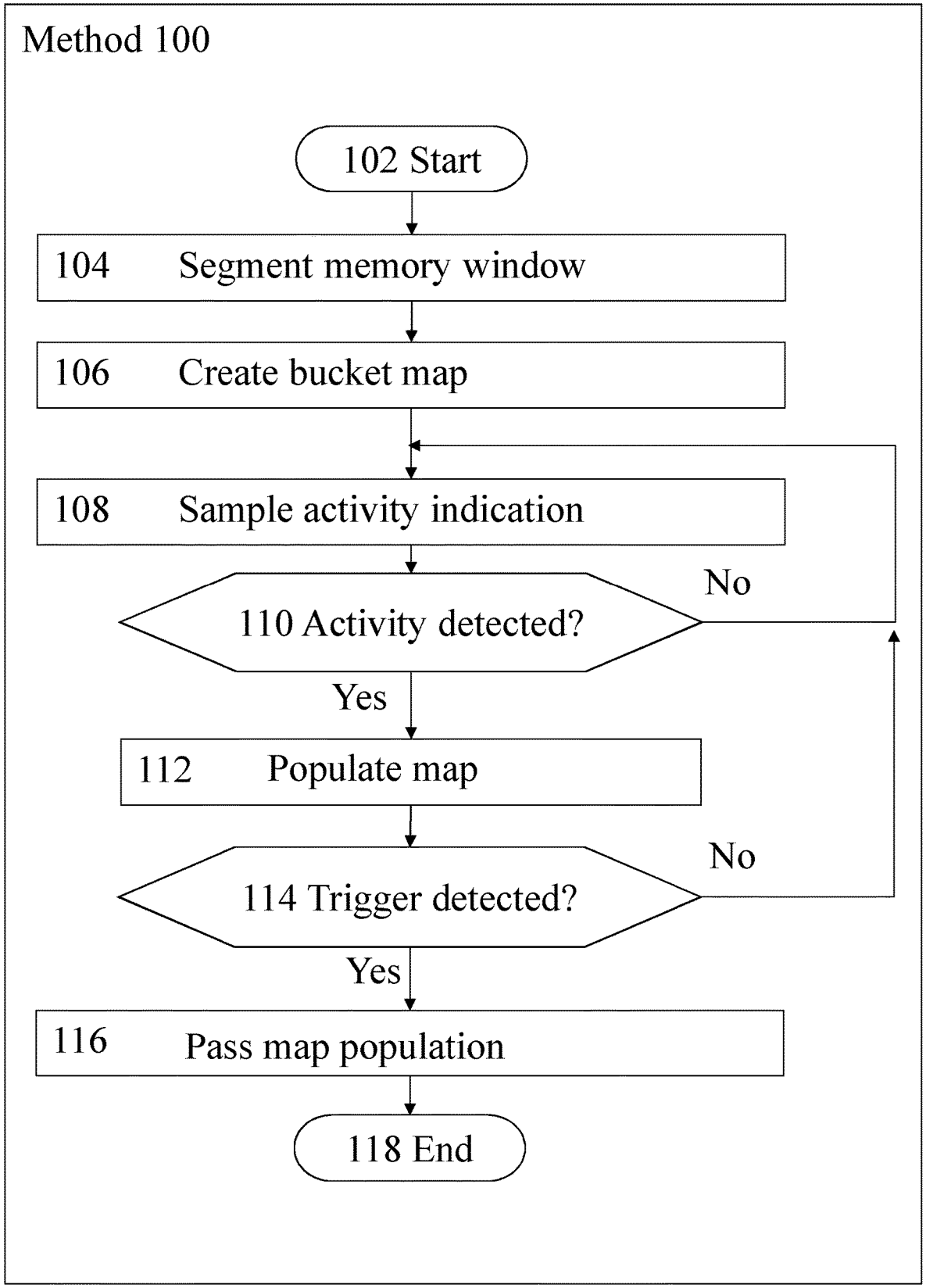
FIG. 1 shows a method of controlling a processing component to sample and map processor activity.

Turning now to FIG. 1, there is shown machine-implemented Method 100 of controlling a first processing component to sample and lossily accumulate statistical activity data for the processing component, beginning at Start step

102. At Segment memory window step 104, a memory window of a processor memory is segmented into data buckets. At Create bucket map step 106 a bucket map is provided in which activity in a data bucket will be mapped. The map may be, for example, an assigned hardware register or an in-memory data structure. The in-memory data structure may be, for example, an array or a circular buffer.

At Sample activity indication step 108, the main processing loop begins as the processing component samples the data bucket for indications of processor activity. The processor activity of interest may include, for example, one or more of: a read instruction, a write instruction, an execute instruction and a jump instruction. The sampling may be done, for example, at random time intervals, at intervals determined by a program counter, or at intervals determined by programmatically selected instruction execution times.

If no activity in a data bucket is detected at Activity detected decision point 110, the processing component loops back and continues the sampling action of Sample activity indication step 108. If activity in a data bucket is detected at Activity detected decision point 110, at Populate map step 112, the map created at Create bucket map step 106 is surjectively populated.

In one exemplary embodiment, the map comprises a two-dimensional matrix of data access addresses over program counter values. This gives a lossy image of the pattern of access to data in memory by various code sections. To improve space consumption, selected data access addresses (such as the program stack address) may be excluded from the lossily accumulated data. Selected address bits of said data access addresses may be masked or removed when assigning data access address values for the matrix. The process of lossily accumulating may include hashing the data access addresses.

For example, to determine the target bucket for collected values like program counter pointers or stack pointers a wide range of hash algorithms can be used to convert the value into a bucket identifier, thus:

Bucket[HASH(ProgramCounter).bits(4)]++;

This calculates the hash of the program counter value, takes the low 4 bits and increments one of the possible $2^4=16$ Buckets by one.

To improve space consumption selected data access address bits—such as the least significant bits of the program stack address—may be masked or removed for reducing the density and space requirement of the resulting hashed data addresses, thus:

Bucket[HASH(ProgramCounter>>12).bits(8)]++;

This truncates the program counter down to $2^12=4096$ byte sized blocks. Each Program Counter Address in one block results in the same hash. The resulting hash is reduced to 8 bits—resulting in 256 possible buckets.

Various filters may be applied to limit the map population further. When Populate map step 112 is complete, Trigger detected test step 114 is executed to test for the fulfillment of a trigger criterion. The trigger criterion may be, for example, a "map full" indicator, a non-error interrupt, an execution mode change, a context switch, or an error interrupt. For example, if a "map full" state is set as a trigger, and that state is detected after Populate map step 112, Trigger detected test step 114 will return positive. If at Trigger detected test step 114 the trigger criterion has not been met, processing returns to Sample activity indication step 108. If at Trigger detected test step 114 the trigger criterion has been met, at Pass map population step 116, at least a part of the map population is passed to at least a second processing component, and Method 100 completes at End step 118. As will be clear to one of ordinary skill in the art, the passing may be done using, for example, a peer-to-peer communication protocol or a client-server communication protocol between physically separate machine complexes, or it may comprise passing using a virtual-machine to virtual-machine communication protocol within a single machine complex. Alternatively, the passing may comprise a transfer of data between sub-components of a processing device—for example, from one domain to another on a chip.

Figure 2:
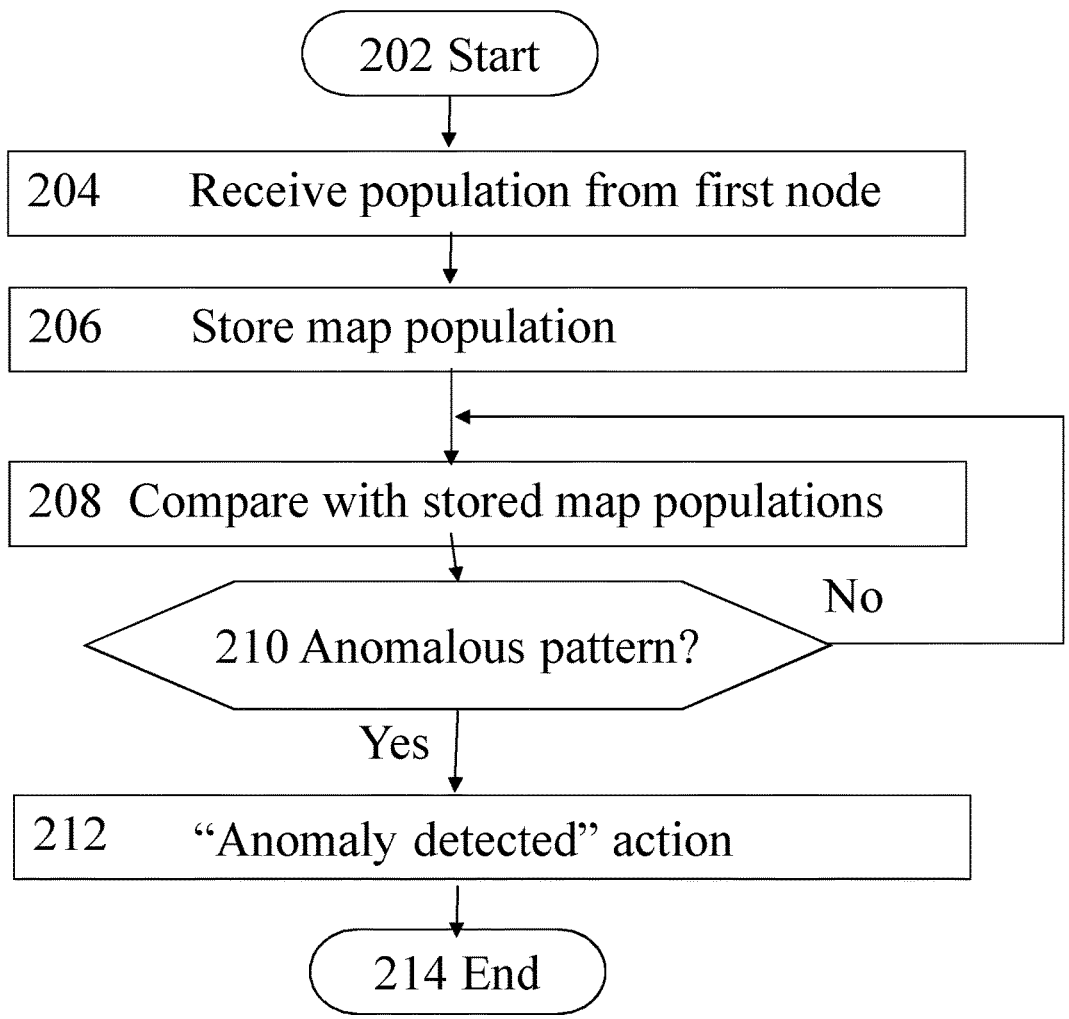
FIG. 2 shows a method of controlling a processing component to analyse mapped data.

The first node having thus populated the bucket map and transmitted it to at least a second processing component, the method of FIG. 2 is initiated. FIG. 2 shows a Method 200 of operating a second processing component in cooperation with a first processing component to analyse lossily accumulated statistical activity data. Commencing at Start step 202, the second processing component, at Receive population from first node step 204 receives all or part of a map population and at Store map population step 206, stores it in second processing component storage. The storage used may be processor memory, or it may be external storage, such as a conventional file system or database.

Over time, the storage at the second processing component will accumulate a large set of map data, and will thus be enabled to conduct statistical analyses over the processing component population using well-known statistical techniques to derive general-case "portraits" of normal and abnormal processor behaviour. Thus the second processing component, at Compare with stored map populations step 208, compares the received bucket map population with the stored map data, seeking correspondences and differences. If the received map population fits the general case "portrait" showing normal processor behaviour, no anomalous patterns are detected at Anomalous pattern test step 210, the test step returns negative, and the process loops back in readiness to analyse further data at Compare with stored map step 208. If an anomalous pattern is found at Anomalous pattern test step 210, an "anomaly detected" action is performed at step 212, and the process instance completes at End step 214.

If an anomalous pattern is found at Anomalous pattern test step 210, Various "anomaly detected" actions may be performed. For example, if the anomalous pattern indicates the presence of malware actions may be taken such as: disabling a malware host; communicating a warning indicator over a network to the first processing component or more widely; quiescing executing instances of a malware host; quarantining a malware host; or preventing start of execution of a new instance of a malware host. As a further example, if the anomalous pattern indicates a common firmware or software error distributed over some portion of the processing component population, further actions may include providing a statistical report to a provider of devices in the population; and requesting further diagnostics from nodes implicated in the anomalous pattern.

Figure 3:
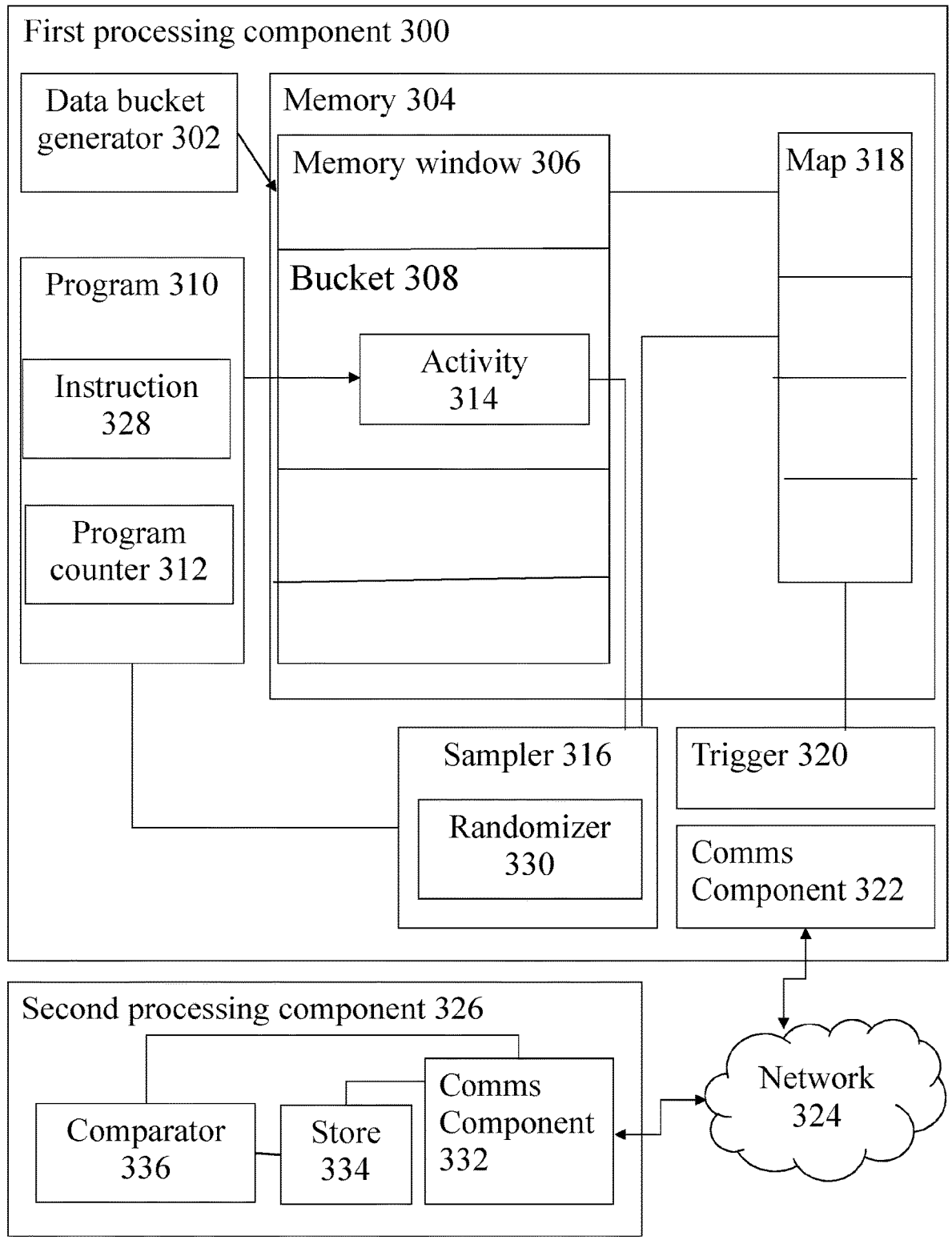
FIG. 3 shows a first and a second processing component in communication over a network.

Methods 100 and 200 for operating processing components having been described, FIG. 3 now shows a system comprising a first and a second processing component operable in communication over a network to implement the disclosed technology. FIG. 3 thus shows First processor node 300 comprising a Data bucket generator 302, Data bucket generator 302 being operable to segment a Memory window 306 within Memory 304 into a plurality of data buckets, exemplified here by Bucket 308. Data bucket generator 302 is further operable to create Map 318. In operation, First processor node 300 executes programs, represented here by Program 310, which use portions of Memory 304 during execution. Sampler 316 is arranged to conduct sampling activity to detect program activities in one or more of Buckets 308 within Memory window 306. Exemplary Activity 314 in Bucket 308 is shown here. Sampler 316 is operable to detect Activity 314 and to surjectively map the existence of that activity in Map 318. Sampler 316 may be operated according to Randomiser 330 to randomly select a particular one of Buckets 308 for sampling. In exemplary alternatives, Sampler 316 may be operated according to predefined triggers fired by Program counter 312, or by the occurrence of predefined instructions, shown here as Instruction 328. Instruction 328 may be, for example, a read instruction, a write instruction, an execute instruction or a jump instruction.

Sampler 316 is operable to populate Map 318 with indicators of activity and to continue operating until a predetermined Trigger 320 has its criterion or criteria met. The trigger criterion may be, for example, a "map full" indicator, a non-error interrupt, an execution mode change, a context switch, or an error interrupt. One or more criteria may be required to be met before the trigger is operated. When Trigger 320 has its criterion met, Comms component 322 (a communications component) is operable to pass the population of Map 318 over Network 324 to Second processor node 326. The passing being shown as transmission over Network 324 is exemplary only, representing the case in which the first and second processor nodes are located in physically-separate machine complexes. The system may also be operable as between processor nodes embodied as virtual machines within a single machine complex. The system may also operate within a single chip having a plurality of domains. Thus, the passing by Comms component 322 may be done using, for example, a peer-to-peer communication protocol or a client-server communication protocol between physically separate machine complexes, or it may comprise passing using a virtual-machine to virtual-machine communication protocol within a single machine complex. Thus there may be provided, for example, an on-chip or off-chip means to detect anomalies and handle them appropriately to achieve improved monitoring of processing component activity.

Further shown in FIG. 3 is Second processor node 326, having a corresponding Comms component 332 operable to receive transmit the population of Map 318 over Network 324 from First processor node 300. Second processor node 326 comprises Store 334, in which the population of Map 318 may be stored. The storage used may be processor memory, or it may be external storage, such as a conventional file system or database. Second processor node 326 further comprises Comparator 336, which is operable to compare the received map population with other map data in Store 334, seeking correspondences and differences. If the received map population fits a general case "portrait" showing normal processor behaviour, no anomalous patterns are detected by Comparator 336. If, however, an anomalous pattern is found by Comparator 336, Second processor node 326 is further operable to perform an "anomaly detected" action, such as transmitting an indicator that there is an anomaly, using Comms component 332 to First processor node 300.

It will be readily observed by one of ordinary skill in the art that, where the activity of a monitor in a single node of a population of nodes can be bounded by the requirement to detect anomalous behaviour in processor activity, it is possible to operate a probabilistic monitor in such a way as to limit its impact on the processor by using frugal code to accumulate a sparse fingerprint of processor activity, rather than a complete trace. Such a fingerprint may comprise a lossy accumulation of data obtained using a spatially-scattered or temporally-intermittent sampling method, controlled, for example, by a randomiser or by some programmatically-selected triggering activities in the processor's repertoire. The outputs of the node monitor may also be rendered more frugal by means of a surjective mapping, whereby a many-to-one relationship is established between the data points in the source—the mapped memory—and the target—the map. Additional frugality of resource use can be achieved by keeping only a small amount of data at the processing component and, acting upon some regular and possibly frequent trigger, send the accumulated data to a further node or nodes for processing. Such a technique may use a single further analyser node, or may, in an alternative, use a distributed network of nodes, such as a processing grid or a cooperative cloud, to analyse the data. Further, as the purpose of the monitoring is to detect anomalous activity in a processing component with respect to a norm in a population of nodes, it may be sufficient to operate the map as a circular buffer, only "freezing" an accumulation of data when a second processor indicates that an anomaly may have been detected. Using this technique, the system operates as a kind of flight-recorder, wherein the data may only be required in the event of an incident requiring investigation, and thus not requiring accumulation of significant amounts of history In a further refinement, there may be provided a plurality of maps charting different characteristics of processing, such that, by varying the collection, accumulation and filtering of data over a period of time, there may be created an "overlay" of maps that provide a sophisticated "landscape" from which anomalies may be detected.

In these ways, the data held at the original node may be kept to a very small consumption of storage resource, and the processing elements at the original node are also restricted to a very small consumption of processing power.

As will be appreciated by one skilled in the art, aspects of the present invention may be embodied as a system, method or computer program product. Accordingly, aspects of the present invention may take the form of an entirely hardware embodiment, an entirely software embodiment, or an embodiment combining software and hardware aspects.

Furthermore, aspects of the present invention may take the form of a computer program product embodied in a computer readable medium having computer readable program code embodied thereon. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

Computer program code for carrying out operations for aspects of the present invention may be written in any combination of one or more programming languages, including object oriented programming languages and conventional procedural programming languages. The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present invention may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present invention may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present invention.

The invention claimed is:

1. A machine-implemented method of operating a first processing component for sampling and accumulating statistical activity data, the method performed at the first processing component comprising:
generating at least one data bucket by segmenting a memory window in a memory of said processing component and providing at least one map of the segmented memory window by assigning an in-memory data structure to which processor activity in the at least one data bucket is mapped;
sampling the at least one data bucket to detect processor activity in said at least one data bucket and surjectively populating said at least one map with statistical activity data, where sampling the at least one data bucket to detect processor activity comprises sampling to detect a predefined instruction; and
when the at least one map is surjectively populated and a trigger criterion is met, passing at least a part of a population of said at least one surjectively populated map to a second processing component to analyze the at least a part of the population of said at least one map.

2. The machine-implemented method as claimed in claim 1, wherein said step of passing comprises passing using a client-server communication protocol between physically separate machine complexes.

3. The machine-implemented method as claimed in claim 1, wherein said step of passing comprises passing using a virtual-machine to virtual-machine communication protocol within a single machine complex.

4. The machine-implemented method as claimed in claim 1, wherein said step of assigning an in-memory data structure comprises creating an array.

5. The machine-implemented method as claimed in claim 1, wherein said step of sampling comprises sampling at intervals determined by a program counter.

6. The machine-implemented method as claimed in claim 1, wherein said step of passing responsive to a trigger comprises responding to a "map full" indicator.

7. The machine-implemented method of claim 1, wherein said at least one map comprises a plurality of maps adapted to plot different characteristics.

8. The machine-implemented method of claim 1, wherein said at least one map comprises a two-dimensional matrix of data access addresses over program counter values.

9. The machine-implemented method of claim 8, wherein selected address bits of said data access addresses are masked or removed when assigning data access address values for said matrix.

10. The machine-implemented method of claim 8, wherein said accumulating comprises hashing said data access addresses.

11. A machine-implemented method of operating a first processing component for sampling and accumulating statistical activity data, the method comprising:
generating at least one data bucket by segmenting a memory window in a memory of said processing component and providing at least one map of the segmented memory window by assigning an in-memory data structure;
sampling to detect activity in said at least one data bucket and surjectively populating said at least one map with statistical activity data; and
responsive to a trigger, passing at least a part of a population of said at least one map to a second processing component, wherein said step of sampling to detect activity comprises sampling to detect a jump instruction.

12. A machine-implemented method of operating a first processing component for sampling and accumulating statistical activity data, the method comprising:
generating at least one data bucket by segmenting a memory window in a memory of said processing component and providing at least one map of the segmented memory window by assigning an in-memory data structure;
sampling to detect activity in said at least one data bucket and surjectively populating said at least one map with statistical activity data; and
responsive to a trigger, passing at least a part of a population of said at least one map to a second processing component, wherein said step of assigning an in-memory data structure comprises creating a circular buffer.

13. A non-transient computer-readable medium comprising computer program code executable by a computer system to perform the steps of operating a first processing component for sampling and accumulating statistical activity data comprising:
generating at least one data bucket by segmenting a memory window in a memory of said processing component and providing at least one map of the segmented memory window by assigning an in-memory data structure to which processor activity in the at least one data bucket is mapped;
sampling the at least one data bucket to detect processor activity in said at least one data bucket and surjectively populating said at least one map with statistical activity data where sampling the at least one data bucket to detect processor activity comprises sampling to detect a predefined instruction; and
when the at least one map is surjectively populated and a trigger criterion is met, passing at least a part of a population of said at least one surjectively populated map to a second processing component to analyze the at least a part of the population of said at least one map.

14. A machine-implemented method of operating a first processing component for sampling and accumulating statistical activity data, the method comprising:

generating at least one data bucket by segmenting a memory window in a memory of said processing component and providing at least one map of the segmented memory window;

sampling to detect activity in said at least one data bucket and surjectively populating said at least one map with statistical activity data; and responsive to a trigger, passing at least a part of a population of said at least one map to a second processing component, wherein said at least one map comprises a two-dimensional matrix of data access addresses over program counter values, wherein selected address bits of said data access addresses are masked or removed when assigning data access address values for said matrix, and wherein the selected data access address bits comprise least significant bits of a program stack address.

15. A machine-implemented method of operating a first processing component for sampling and accumulating statistical activity data, the method comprising:

generating at least one data bucket by segmenting a memory window in a memory of said processing component and providing at least one map of the segmented memory window;

sampling to detect activity in said at least one data bucket and surjectively populating said at least one map with statistical activity data; and responsive to a trigger, passing at least a part of a population of said at least one map to a second processing component, wherein said step of passing comprises passing using a virtual-machine to virtual-machine communication protocol within a single machine complex, and transferring data between domains within a single chip having a plurality of domains.

* * * * *